INVENTOR.
FLOYD H. HENSON
BY T. L. Bowes
ATTORNEY

INVENTOR.
FLOYD H. HENSON
BY T. L. Bowes
ATTORNEY

INVENTOR.
FLOYD H. HENSON
BY T. L. Bowes
ATTORNEY

United States Patent Office 2,765,370
Patented Oct. 2, 1956

2,765,370

GRADUATED HOWLER CIRCUIT

Floyd H. Henson, Rochester, N. Y., assignor, by mesne assignments, to General Dynamics Corporation, a corporation of Delaware Application May 26, 1952, Serial No. 290,053

5 Claims. (Cl. 179—27)

This invention relates to telephone systems and more particularly to howlers for such systems in order that howler tone may be applied to a subscriber's line conductors as an audible signal for attracting the attention at a subscriber's station to an off-hook or unrestored condition of the receiver or handset.

It is an object of my invention to provide a new and improved howler for telephone systems.

It is another object of my invention to provide a source of howler tone embodying electron discharge devices.

Figure 2:
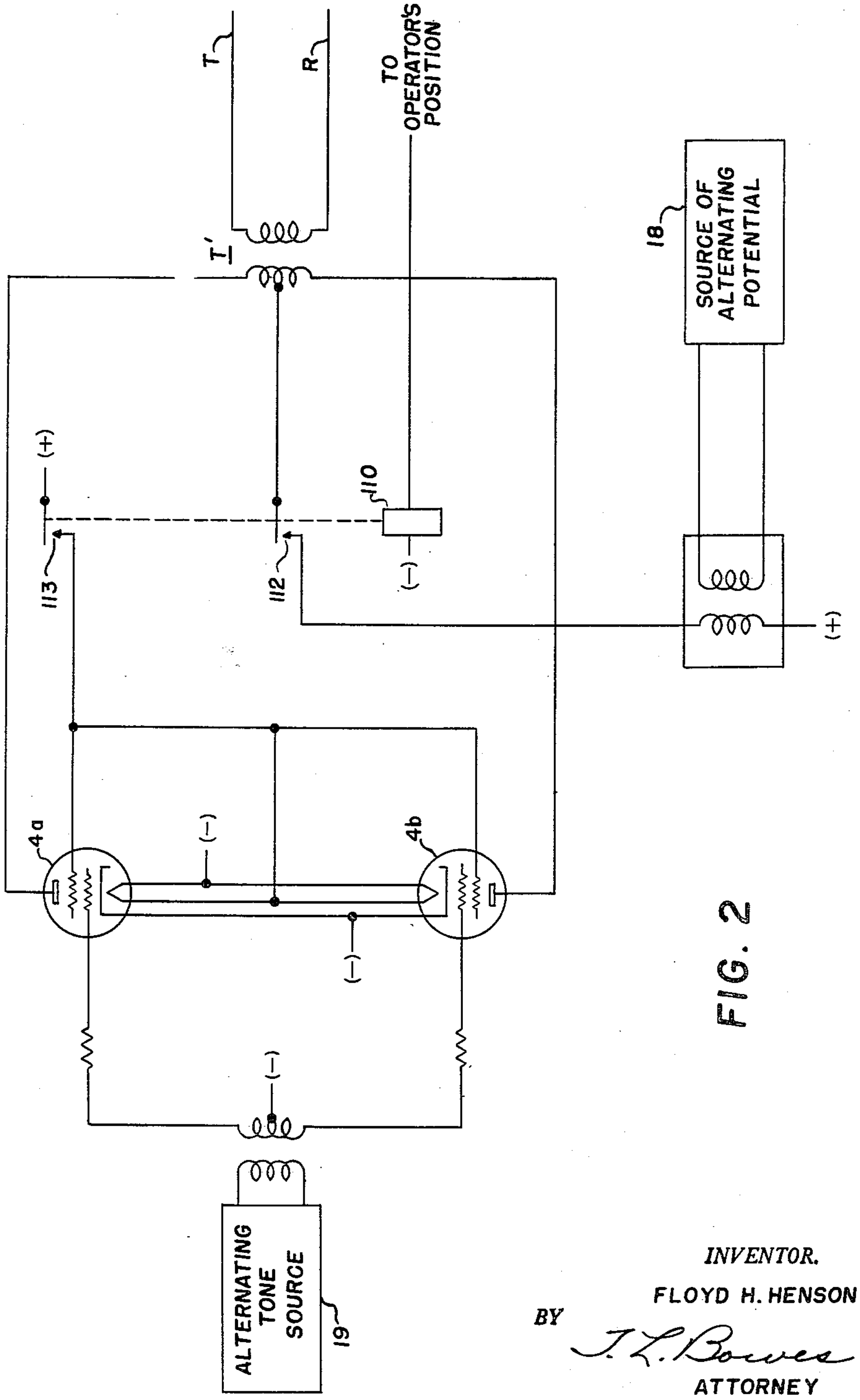
Figure 3:
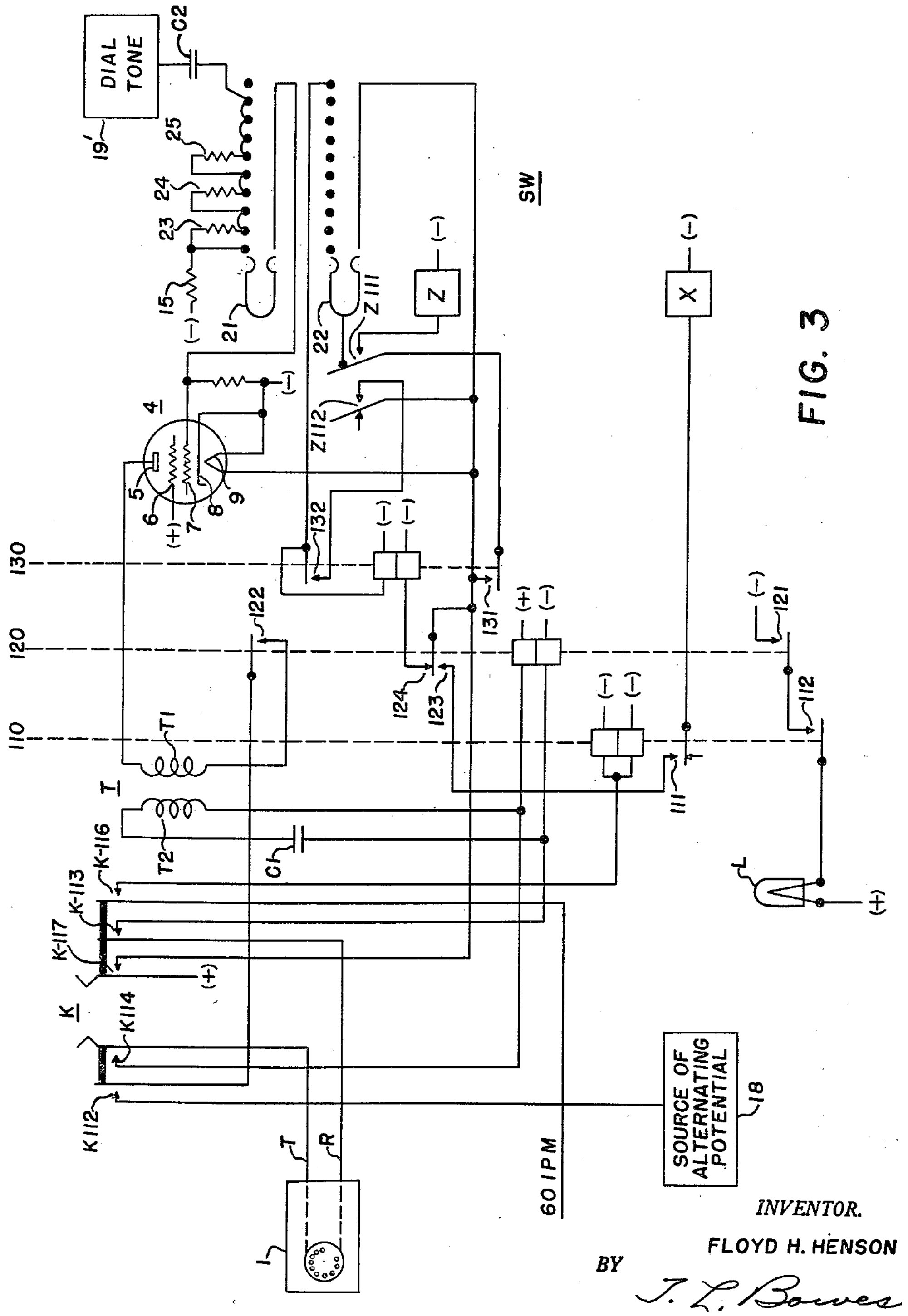

The features of my invention which I believe to be novel are set forth with particularity in the appended claims. My invention itself, both as to its organization and manner of operation, together with further objects and advantages thereof, may best be understood by reference to the following description taken in connection with the accompanying drawings in which Fig. 1 is a circuit diagram of one embodiment of my invention, Fig. 2 is a modification of the howler system shown in Fig. 1 and Fig. 3 is still another embodiment of the principles of my invention in which a graduated howler tone is provided automatically.

In the various figures of the drawings the same reference numerals are used to indicate corresponding parts of the other figures.

Figure 1:
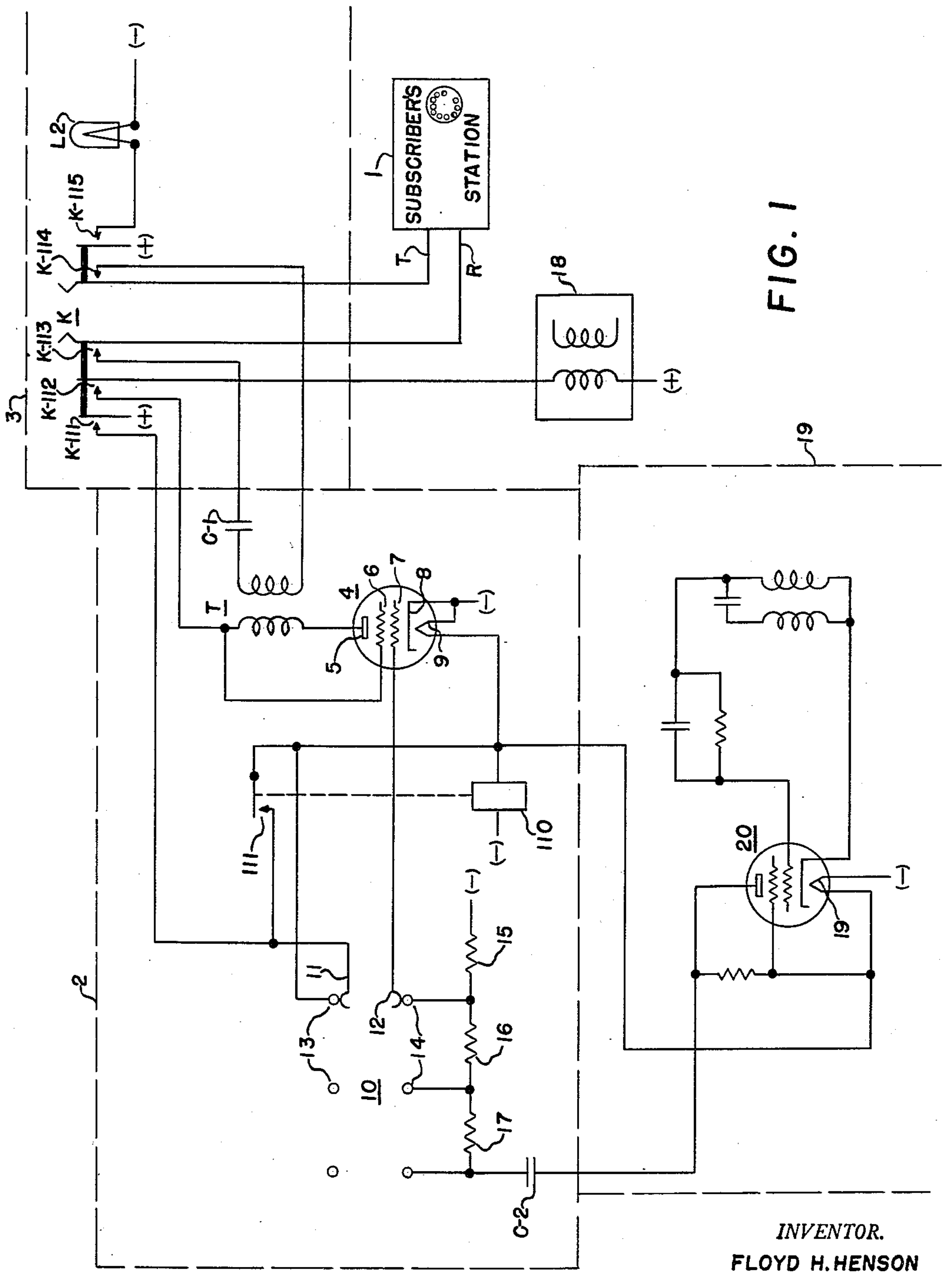

Referring particularly to Fig. 1, there is illustrated a subscriber's station 1 having associated therewith a conventional telephone instrument. The line conductors T and R extending to substation 1 may terminate in a suitable jack at a switchboard or may be accessible by way of an automatic switch train. In either case, means are provided for connecting graduated howler tone to the conductors T and R.

There is provided a source 2 of howler tone and source 2 may be connected to the substation 1 through an operator's position indicated by the numeral 3, the latter including a suitable key K and signal lamp L2. Whenever the receiver at substation 1 is in an off-hook or unrestored condition, whether intentionally or unintentionally, the operator at position 3, by moving key K in the direction indicated by the arrow may apply howler tone from source 2 to conductors T and R by way of contacts K113 and K114.

The howler circuit 2 is of the graduated type and comprises an electron discharge device 4 of suitable type, such as a screen grid vacuum tube, for example, including an anode 5, a screen grid 6, a control electrode or grid 7, a cathode 8, and heater or filament 9. In order to enable the operator manually to increase the volume of the howler tone applied to conductors T and R in graduated steps, there is provided in the input circuit to tube 4 a manually adjustable two-section switch 10 having movable brushes 11 and 12 arranged to successively engage sets of contacts 13 and 14 respectively. Contacts 14 are connected to different positions on a suitable resistor or voltage divider comprising resistances 15, 16, and 17. In the drawing resistor 15 is connected between the first pair of contacts 14 and a suitable source of negative potential indicated by (—), resistance 16 is connected between the first and second contacts 14, and resistor 17 is connected between the second and third contacts 14. Brush 12 of switch 10 is connected directly to grid 7. Cathode 8 and one side of heater 9 are connected to battery, indicated by the symbol (—). The other terminal of heater 9 is connected to one terminal of the winding of relay 110, the other terminal of relay 110 being connected to battery so that the winding of relay 110 and heater 9 are connected in parallel to a suitable source of grounded positive potential indicated by the symbol (+) in a manner to be explained later. Anode 5 is connected to a source of anode potential through an output circuit including (+), the primary of transformer T, and contacts K112 of key K. A source of alternating current such as superimposed tone source 18 is also connected to anode 5. Tone source 18 may be any suitable source and may comprise the superimposition of a predetermined ringing frequency, as for example 20 cycles alternating current.

With key K in the closed or operated condition and switch 10 on its first or home position, as illustrated in Fig. 1, a circuit is completed for energizing howler relay 110 from (+) through operated contacts K111, brush 11, contact 13 and winding of relay 110 to battery. When relay 110 operates, there is completed a circuit for holding operated relay 110 from (+) through operated contacts K111 and operated contacts 111. Hence relay 110 remains operated until the operator releases key K in order to break the holding circuit at contacts K111.

The operation of key K also completes a circuit for energizing heater 9 by the previously traced circuit since heater 9 is in parallel with the winding of relay 110. The output of discharge device 4 is applied to the line conductors T and R through output transformer T, capacitor C–1 and operated contacts K114 and K113 respectively.

The operation of key K also lights signal lamp L2 through operated contacts K115.

It will be understood by those skilled in the art that the superimposed alternating frequency furnished by source 18 imposes a tone signal on conductors T and R. In order further to modulate the tone applied to the subscriber's line, a suitable signal potential of alternating frequency is applied to grid 7. One form of tone source, represented generally by numeral 19 comprises an electronic oscillator. Generator 19 may be rendered operative by the application of ground to heater 19 of electron discharge device 20 through operated contacts K111, brush 11, and contact 13 to the heater 19. The output of tone source 19 is connected to the last contact 14 by means of coupling capacitor C–2.

The volume of howler tone applied to conductors T and R depends upon the position of switch 10. In the position shown, resistors 16 and 17 are connected in series with tone source 19 and grid 17, resistor 15 providing grid bias. If brushes 11 and 12 are moved to engage the second contact in the respective set of contacts, resistor 16 is removed from the second input circuit to grid 7 and inserted in series with resistor 15 to provide bias for grid 7. Finally, if brushes 11 and 12 are moved to their third positions, all resistance is cut out of the tone input circuit to grid 7.

Attention is called to the fact that ground for operating relay 110 and energizing heater 9 is furnished through brush 11 and contact 13 in the first position of the switch, but is furnished through operated contacts 111 in all other positions of switch 10.

Fig. 2 represents a different embodiment of my invention in which the graduated tone feature is not shown although switch 10 or its equivalent can be employed if desired. Moreover, instead of employing a single electron discharge device there is provided a pair of electron discharge devices 4*a* and 4*b* connected in push-pull relationship. In this arrangement, relay 110 may be operated in the same manner as described in connection with Fig. 1 in order to connect source 18 and (+) to the anodes of devices 4*a* and 4*b* through operated contacts 112 and windings of transformer T′. Operation of relay 110 also connects (+) through operated contacts 113 to the screen grids and heaters of discharge devices 4*a* and 4*b*. Further description of the embodiment of Fig. 2 is believed unnecessary.

Fig. 3 represents a modification of my invention in which a switch SW of the minor switch type is employed for automatically and mechanically increasing the volume of tone applied to conductors T and R in graduated steps. When the operator's key K is moved to its closed position, leads T and R are connected to the secondary winding of output transformer T through operated contacts K114 and K113 respectively, capacitor C–1 being connected in the ring side of the line. Inasmuch as the howler circuit of Fig. 3 is to be applied to conductors T and R only in an unrestored or off-hook position of the telephone at subscriber's station 1, there exists a closed loop condition which completes a circuit for energizing relay 120 from (+) through the upper winding of relay 120, operated contacts K114, conductor T, subscriber's loop, conductor R, operated contacts K113 and lower winding of relay 120 to (−). The operation of key K also applies (+) to heater 9 of discharge device 4 by way of operated contacts K117.

Means is provided for stepping switch SW at a predetermined rate as for example at the rate of 60 steps per minute. For this purpose there is provided a stepping relay 110, the windings of which are connected in parallel from (−) to a suitable source of pulses as indicated by the lead marked "60 IPM" by way of operated contacts 116. Each operation of relay 110 completes a circuit for energizing stepping magnet X of switch SW from ground by way of operated contacts K117, operated contacts 123, operated contacts 111 and magnet X to (−). Thus during each operation of relay 110, stepping magnet X is operated to advance brushes 21 and 22 of switch SW. The pulsing of relay 110 also causes lamp L to flash over a circuit extending from battery at operated contacts 121 through operated contacts 112 and lamp L to (+).

The upper or top level of switch SW is provided with a plurality of resistors 23, 24, and 25 connected as shown to predetermined contacts of the top section of switch SW. Thus resistor 23 is connected between the first and second contacts, resistor 24 is connected between the third and fourth contacts, and resistor 25 is connected between the fifth and sixth contacts. It will also be observed that contacts 2 and 3, and contacts 4 and 5, are jumpered or strapped together. Moreover, the sixth to ninth, inclusive, contacts are also jumpered or strapped together and connected to a suitable source of tone, such as the conventional dial tone, for example, through coupling capacitor C–2. Resistor 15 is connected between (−) and the first contact. Thus, when brush 21 engages the first contact, tone source 19′ is connected through resistors 25, 24, and 23 and brush 21 to grid 7. With switch SW at its second position, tone source 19′ is connected to grid 7 through resistors 24 and 25. When brush 21 reaches the fifth contact, only resistor 25 is left in the input circuit and on the remaining contacts of switch SW there is no resistance in series with tone source 19. Thus, as switch SW advances on the first position of switch SW, tone is applied to conductors T and R at a minimum volume level. On positions 2 and 3 the volume is increased and on positions 5 to 10 inclusive the maximum volume is applied.

Means is provided for returning switch SW to its normal or home position in response to the positioning of the switch at its tenth position. For this purpose means is provided for operating relay 130 to close contacts 131 on the tenth position of switch SW and for connecting release magnet Z of switch SW to ground responsive to the operation of relay 130 on the tenth position of switch SW. Thus, when switch SW reaches the tenth position ground is connected to operate relay 130 through operated contacts K117, brush 22, tenth contact of the bottom section and upper winding of relay 130 to (−). In response to the operation of relay 130 over the foregoing circuit, there is completed a circuit for energizing release magnet Z through operated contacts Z-111 and 131 to ground at operated contacts K117 and switch SW restores. In order to maintain relay 130 operated during the return time of switch SW, the upper winding of relay 130 is connected to ground through operated contacts 132, operated contacts Z112, and operated contacts K117.

As soon as switch SW returns to its normal position, as shown in Fig. 3, operated contacts Z111 and Z112 open and thereby break the operating circuit for magnet Z and the holding circuit for relay 130. If the receiver is still in the off-hook or unrestored position at substation 1, the pulses over the 60 IPM lead are again effective to advance switch SW, whereupon the same gradually increasing volume of howler tone is again applied to the line.

Means is provided for returning switch SW to its normal or home position whenever the receiver is restored at substation 1. The restoration of the receiver breaks the subscriber's loop and thereby releases relay 120. Upon the release of relay 120 there is completed a circuit for energizing relay 130 through its lower winding by way of normal contacts 124 and operated contacts K117 to ground. Upon the operation of relay 130 release magnet Z is energized in the previously described manner and the switch SW is returned to its home position. Since relay 110 remains released, magnet X is not pulsed to reoperate switch SW.

While I have shown and described a particular embodiment of my invention, it will be obvious to those skilled in the art that changes and modifications may be made without departing from my invention in its broader aspects. I, therefore, aim in the appended claims to cover all such changes and modifications as fall within the true spirit and scope of my invention.

What I claim is:

1. In a telephone system, a line, a subscriber's substation connected to said line, an operator's position, a key at said operator's position, a manually adjustable switch at said operator's position, said switch having a plurality of contacts, a movable brush positioned to engage successively said contacts, an electron discharge device having an anode, a cathode, a control electrode and a cathode heater, an output circuit connected to said anode and including a source of positive potential and an output transformer in series, a first source of alternating potential superimposed on said output circuit, a source of negative potential, a second source of alternating potential, a resistor connected between said second source and said negative source, successive contacts of said plurality of contacts being connected to different portions of said resistor, said brush being connected to said control electrode so that the value of resistance in series with said second source of alternating potential is selectively adjusted according to the movement of said brush, a relay, means responsive to the operation of said key at said operator's position for operating said relay and causing current to flow through said cathode heater whereby a howler tone signal of predetermined amplitude is applied to said line through said output circuit, and means responsive to the operation of said relay for thereafter holding said relay operated and said discharge device in conductive condition 2. In a telephone system, a line, a subscriber's substation connected to said line, an operator's position, a key at said operator's position, a switch at said operator's position, said switch having a plurality of contacts, a movable brush positioned to engage successively said contacts, an electron discharge device having an anode, a cathode, a control electrode and a cathode heater, an output circuit connected to said anode and including a source of positive potential and an output transformer in series, a first source of alternating potential superimposed on said output circuit, a source of negative potential, a second source of alternating potential, a resistor connected between said second source and said negative source, successive contacts of said plurality of contacts being connected to different portions of said resistor, said brush being connected to said control electrode so that the value of resistance in series with said second source of alternating potential is selectively adjusted according to the movement of said brush, a relay, means responsive to the operation of said key at said operator's position for operating said relay and causing current to flow through said cathode heater whereby a howler tone signal of predetermined amplitude is applied to said line through said output circuit, means responsive to the operation of said relay for thereafter holding said relay operated and said discharge device in conductive condition, and means for selectively positioning said brush to vary the amount of resistance in series with said control electrode in order to vary the amplitude of signal impressed on said control electrode and hence the volume of tone impressed upon said line.

3. In a telephone system, a line, a subscriber's substation connected to said line, an operator's position, a key at said operator's position, a manually adjustable switch at said operator's position, said switch having first and second levels, said first level comprising a first set of contacts and said second level comprising a second set of contacts, a first movable brush positioned to engage successively said contacts of said first set, a second movable brush positioned to engage successively contacts of said second set, an electron discharge device having an anode, a cathode, a control electrode and a cathode heater, an output circuit connected to said anode and including a source of positive potential and an output transformer in series, a first source of alternating potential superimposed on said output circuit, a source of negative potential, a second source of alternating potential, a resistor connected between said second source and said negative source, successive contacts of said first set being connected to different portions of said resistor, said first brush being connected to said control electrode so that the value of resistance in series with said second source of alternating potential is selectively adjusted according to the movement of said first brush, a relay, means for connecting said relay between said negative source and the first contact of said second set of contacts, means responsive to the operation of said key at said operator's position when said second brush engages the first contact in said second set of contacts for operating said relay and causing current to flow through said cathode heater whereby a howler tone signal of predetermined amplitude is applied to said line through said output circuit, and means responsive to the operation of said relay for thereafter holding said relay operated and said discharge device in conductive condition irrespective of the positions of said brushes.

4. In a telephone system, a line, a subscriber's substation connected to said line, an operator's position, a key at said operator's position, a switch at said operator's position, said switch having first and second levels, said first level comprising a first set of contacts and said second level comprising a second set of contacts, a first movable brush positioned to engage successively contacts of said first set, a second movable brush positioned to engage successively contacts of said second set, an electron discharge device having an anode, a cathode, a control electrode and a cathode heater, an output circuit connected to said anode and including a source of positive potential and an output transformer in series, a first source of alternating potential superimposed on said output circuit, a source of negative potential, a source of alternating potential, a second resistor connected between said second source and said negative source, successive contacts of said first set being connected to different portions of said resistor, said first brush being connected to said control electrode so that the value of resistance in series with said second source of alternating potential is selectively adjusted according to the movement of said first brush, a relay, means for connecting said relay between said negative source and the first contact of said second set of contacts, means responsive to the operation of said key at said operator's position when said second brush engages the first contact in said second set of contacts for operating said relay and causing current to flow through said cathode heater whereby a howler tone signal of predetermined amplitude is applied to said line through said output circuit, means responsive to the operation of said relay for thereafter holding said relay operated and said discharge device in conductive condition irrespective of the positions of said brushes, and means for selectively positioning said first brush to vary the amount of resistance in series with said control electrode in order to vary the amplitude of signal impressed on said control electrode and hence the volume of tone impressed upon said line.

5. In a telephone system, a line, a subscriber's substation connected to said line, an operator's position, a switch at said operator's position comprising a plurality of contacts, a movable brush positioned to engage successively said contacts, an electron discharge device having an anode, a cathode, and a control electrode, an output circuit connected to said anode and including a source of positive potential and an output transformer in series, a first source of alternating potential superimposed on said output circuit, a source of negative potential, a second source of alternating potential, a resistor connected between said second source and said negative source, successive contacts of said plurality of contacts being connected to different portions of said resistor, said brush being connected to said control electrode so that the value of resistance in series with said second source of alternating potential is selectively adjusted according to the movement of said brush, means controlled from said operator's position for connecting said output circuit to said line, and means controlled from said operator's position for selectively positioning said brush.

References Cited in the file of this patent

UNITED STATES PATENTS

| | | |
|---|---|---|
| 1,509,851 | Trapp | Sept. 30, 1924 |
| 2,303,484 | Madsen | Dec. 1, 1942 |